United States Patent
Woodley

(10) Patent No.: US 10,106,158 B2
(45) Date of Patent: Oct. 23, 2018

(54) CONTROL SYSTEM AND METHOD

(71) Applicant: Jaguar Land Rover Limited, Whitley, Coventry, Warwickshire (GB)

(72) Inventor: Jonathan Woodley, Warwick (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 177 days.

(21) Appl. No.: 15/120,074

(22) PCT Filed: Jan. 23, 2015

(86) PCT No.: PCT/EP2015/051401
§ 371 (c)(1),
(2) Date: Aug. 18, 2016

(87) PCT Pub. No.: WO2015/124380
PCT Pub. Date: Aug. 27, 2015

(65) Prior Publication Data
US 2017/0096140 A1    Apr. 6, 2017

(30) Foreign Application Priority Data
Feb. 18, 2014    (GB) .................................. 1402888.0

(51) Int. Cl.
*B60T 8/32*        (2006.01)
*G06F 7/00*        (2006.01)
(Continued)

(52) U.S. Cl.
CPC .......... *B60W 30/143* (2013.01); *B60W 10/06* (2013.01); *B60W 10/184* (2013.01);
(Continued)

(58) Field of Classification Search
CPC combination set(s) only.
See application file for complete search history.

(56) References Cited

U.S. PATENT DOCUMENTS 5,215,159 A * 6/1993 Nishida .............. B60K 31/0008
                                                    180/169
5,737,714 A * 4/1998 Matsuno ............ B60K 17/3462
                                                    180/197
(Continued)

FOREIGN PATENT DOCUMENTS

DE    102011090028 A1    2/2013
EP         1065090 A2    1/2001
(Continued)

OTHER PUBLICATIONS

Combined Search and Examination Report for application No. GB1402888.0, dated Sep. 18, 2014, 10 pages.
(Continued)

*Primary Examiner* — Khoi H Tran
*Assistant Examiner* — Jorge O Peche
(74) *Attorney, Agent, or Firm* — Reising Ethington P.C.

(57) ABSTRACT

Some embodiments of the present invention provide a system comprising: a first, controller operable to assume an off state or one of one or more on states, in a first on state the first controller being configured to generate a first controller powertrain signal in order to cause a powertrain to develop drive torque and cause a vehicle to operate in accordance with a target speed value, the system being configured to cause the first controller to assume the first on state in dependence at least in part on receipt of a first input signal indicative that the controller is required to assume the first on state and a second signal indicative that a driver is maintaining a driver-operated brake control device in a brake-applied condition, being a condition in which a braking system of a vehicle is caused to apply a brake to one or more wheels.

20 Claims, 9 Drawing Sheets

(51) Int. Cl.
   *B60W 30/14* (2006.01)
   *B60W 10/184* (2012.01)
   *B60W 10/06* (2006.01)
   *B60W 50/10* (2012.01)
   *B60W 30/18* (2012.01)
   *B60W 30/188* (2012.01)

(52) U.S. Cl.
   CPC .... *B60W 30/188* (2013.01); *B60W 30/18063* (2013.01); *B60W 50/10* (2013.01); *B60W 2520/10* (2013.01); *B60W 2540/12* (2013.01); *B60W 2710/0666* (2013.01); *B60W 2720/10* (2013.01)

(56) References Cited

U.S. PATENT DOCUMENTS

| Patent/Pub. No. | Date | Name | Classification |
|---|---|---|---|
| 6,330,508 B1* | 12/2001 | Akabori | B60K 31/0008 340/903 |
| 8,510,011 B2* | 8/2013 | Inoue | B60W 10/06 477/34 |
| 9,666,070 B2* | 5/2017 | Otake | G08G 1/096716 |
| 9,789,868 B2* | 10/2017 | Gibson | B60W 20/40 |
| 9,849,879 B2* | 12/2017 | Kelly | B60W 30/143 |
| 9,849,880 B2* | 12/2017 | D'Amato | B60W 50/0097 |
| 9,873,430 B2* | 1/2018 | Kelly | B60W 30/143 |
| 9,873,437 B2* | 1/2018 | Fung | B60W 40/08 |
| 9,969,262 B2* | 5/2018 | Woodley | B60K 31/02 |
| 2004/0195022 A1* | 10/2004 | Inoue | B60K 31/0008 180/170 |
| 2005/0203692 A1* | 9/2005 | Suzuki | B60K 31/0066 701/70 |
| 2006/0041366 A1* | 2/2006 | Kato | B60T 8/171 701/72 |
| 2007/0050120 A1* | 3/2007 | Tabata | B60K 6/44 701/80 |
| 2007/0255481 A1* | 11/2007 | Egawa | B60W 30/16 701/96 |
| 2008/0154472 A1* | 6/2008 | Okuda | B60K 6/44 701/93 |
| 2009/0024294 A1* | 1/2009 | Ishida | B60T 8/175 701/87 |
| 2009/0025996 A1* | 1/2009 | Inoue | B60K 31/0066 180/179 |
| 2009/0112437 A1* | 4/2009 | Luehrsen | B60T 8/175 701/84 |
| 2009/0132138 A1* | 5/2009 | Yasuhito | B60K 31/02 701/70 |
| 2010/0004832 A1* | 1/2010 | Otake | B60T 8/175 701/54 |
| 2010/0082216 A1* | 4/2010 | Yasui | B60K 31/0066 701/93 |
| 2010/0145588 A1* | 6/2010 | Reuschel | B60W 10/02 701/70 |
| 2011/0153175 A1* | 6/2011 | Zhang | B60W 40/09 701/70 |
| 2012/0053807 A1* | 3/2012 | Salinger | B60W 30/143 701/93 |
| 2012/0271499 A1* | 10/2012 | Inoue | B60T 7/12 701/23 |
| 2013/0226408 A1* | 8/2013 | Fung | B60W 40/09 701/41 |
| 2013/0261866 A1* | 10/2013 | Hoshiba | F02D 29/02 701/22 |
| 2013/0291830 A1* | 11/2013 | Doering | F02D 41/023 123/350 |
| 2013/0296102 A1* | 11/2013 | Banker | B60W 10/196 477/4 |
| 2013/0296119 A1* | 11/2013 | Reed | B60W 10/02 477/5 |
| 2013/0296121 A1* | 11/2013 | Gibson | F02D 41/022 477/5 |
| 2013/0296123 A1* | 11/2013 | Doering | B60W 10/02 477/5 |
| 2013/0296125 A1* | 11/2013 | Gibson | B60W 20/10 477/5 |
| 2013/0296126 A1* | 11/2013 | Gibson | F02N 11/006 477/5 |
| 2013/0296130 A1* | 11/2013 | Banker | B60W 10/184 477/27 |
| 2013/0296136 A1* | 11/2013 | Doering | B60K 6/48 477/167 |
| 2013/0297123 A1* | 11/2013 | Gibson | B60W 20/1084 701/22 |
| 2013/0297161 A1* | 11/2013 | Gibson | B60W 20/00 701/54 |
| 2013/0297191 A1* | 11/2013 | Gibson | F02N 11/0855 701/112 |
| 2014/0277990 A1* | 9/2014 | Zambou | B60K 31/0008 701/96 |
| 2014/0379213 A1* | 12/2014 | Otake | G08G 1/09626 701/36 |
| 2015/0073621 A1* | 3/2015 | Kida | B60W 10/06 701/1 |
| 2015/0191160 A1* | 7/2015 | Fairgrieve | B60K 31/02 701/93 |
| 2015/0217768 A1* | 8/2015 | Fairgrieve | B60W 30/143 701/93 |
| 2015/0217770 A1* | 8/2015 | Fairgrieve | B60K 31/02 701/82 |
| 2015/0217771 A1* | 8/2015 | Kelly | B60W 30/025 701/93 |
| 2015/0298697 A1* | 10/2015 | Kelly | B60W 50/082 701/37 |
| 2015/0329108 A1* | 11/2015 | Kodaira | B62D 15/025 701/41 |
| 2016/0001781 A1* | 1/2016 | Fung | G06F 19/345 701/36 |
| 2016/0114792 A1* | 4/2016 | Gibson | B60L 11/1861 701/22 |
| 2016/0185350 A1* | 6/2016 | Kelly | B60W 10/06 701/94 |
| 2016/0194001 A1* | 7/2016 | Kelly | B60K 28/165 701/41 |
| 2016/0194002 A1* | 7/2016 | Kelly | B60W 50/14 701/22 |
| 2016/0200323 A1* | 7/2016 | Kelly | B60W 50/12 701/51 |
| 2016/0244057 A1* | 8/2016 | Kelly | B60W 30/143 |
| 2016/0297435 A1* | 10/2016 | D'Amato | B60W 30/143 |
| 2016/0318509 A1* | 11/2016 | Rycroft | B60T 8/1755 |
| 2017/0001645 A1* | 1/2017 | Fairgrieve | B60K 28/16 |
| 2017/0057505 A1* | 3/2017 | Woodley | B60W 10/06 |
| 2017/0057506 A1* | 3/2017 | Jerger | B60W 10/06 |
| 2017/0057511 A1* | 3/2017 | Woodley | B60K 28/04 |
| 2017/0057512 A1* | 3/2017 | Woodley | B60W 10/06 |
| 2017/0066326 A1* | 3/2017 | Woodley | B60K 31/02 |
| 2017/0066441 A1* | 3/2017 | Woodley | B60W 50/023 |
| 2017/0066442 A1* | 3/2017 | Woodley | B60T 17/221 |
| 2017/0080931 A1* | 3/2017 | D'Amato | B60W 30/143 |
| 2017/0088135 A1* | 3/2017 | Kelly | B60W 30/146 |
| 2017/0190330 A1* | 7/2017 | Kelly | B60W 30/02 |
| 2017/0197619 A1* | 7/2017 | Kelly | B60W 30/143 |
| 2017/0225674 A1* | 8/2017 | Doering | B60W 20/16 |
| 2017/0259826 A1* | 9/2017 | Martin | B60W 10/08 |
| 2017/0274878 A1* | 9/2017 | Fairgrieve | B60K 28/16 |
| 2017/0291599 A1* | 10/2017 | Pietron | B60W 20/40 |
| 2017/0349179 A1* | 12/2017 | Cunningham | B60W 30/181 |
| 2017/0356375 A1* | 12/2017 | Glugla | F02D 41/0087 |
| 2017/0369064 A1* | 12/2017 | Cunningham | F16H 61/143 |
| 2017/0369066 A1* | 12/2017 | Pursifull | B60W 30/1888 |
| 2018/0001897 A1* | 1/2018 | Brockley | B60W 30/18172 |
| 2018/0022358 A1* | 1/2018 | Fung | G06K 9/00536 701/36 |
| 2018/0105180 A1* | 4/2018 | Fung | B62D 6/00 |
| 2018/0126987 A1* | 5/2018 | Burford | B60W 30/143 |

(56) References Cited

U.S. PATENT DOCUMENTS

2018/0134291 A1* 5/2018 Burford .............. B60W 30/143
2018/0141550 A1* 5/2018 Kelly .................... B60W 10/16

FOREIGN PATENT DOCUMENTS

| EP | 1065115 A2 | 1/2001 |
|---|---|---|
| GB | 2505027 A | 2/2014 |
| WO | WO2013124321 A1 | 8/2013 |
| WO | WO2014027058 A1 | 2/2014 |
| WO | WO2014037515 A1 | 3/2014 |

OTHER PUBLICATIONS

International Search Report for International application No. PCT/EP2015/051401, dated Apr. 29, 2015, 7 pages.
Written Opinion for International application No. PCT/EP2015/051401, dated Apr. 29, 2015, 8 pages.

* cited by examiner

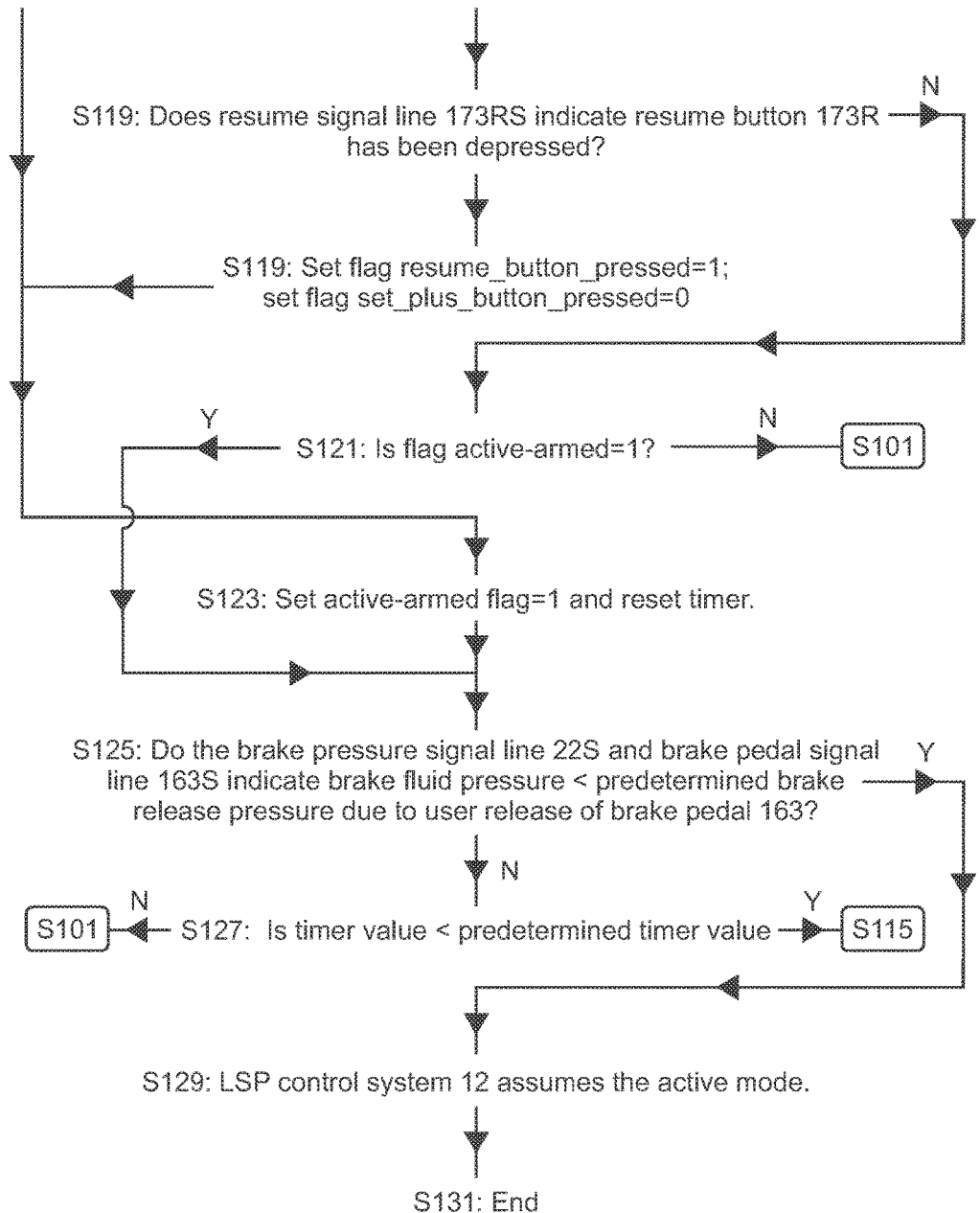
FIGURE 8, continued

CONTROL SYSTEM AND METHOD

INCORPORATION BY REFERENCE

The content of UK patent applications GB2492748, GB2492655 and GB2499252 is incorporated herein by reference.

TECHNICAL FIELD

The present invention relates to vehicle speed control systems. In particular but not exclusively the invention relates to monitoring of vehicle speed control systems to ensure correct operation.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common.

It is an aim of embodiments of the present invention to address disadvantages associated with the prior art.

SUMMARY OF THE INVENTION

Embodiments of the invention may be understood with reference to the appended claims.

Aspects of the present invention provide an apparatus, a vehicle and a method.

In one aspect of the invention for which protection is sought there is provided a system comprising: a first, controller operable to assume an off state or one of one or more on states, in a first on state the first controller being configured to generate a first controller powertrain signal in order to cause a powertrain to develop drive torque and cause a vehicle to operate in accordance with a target speed value, the system being configured to cause the first controller to assume the first on state in dependence at least in part on receipt of a first input signal indicative that the controller is required to assume the first on state and a second signal indicative that a driver is maintaining a driver-operated brake control device in a brake-applied condition, being a condition in which a braking system of a vehicle is caused to apply a brake to one or more wheels.

Thus it is to be understood that assumption of the first on state may be prevented unless the first input signal indicates that the controller is required to assume the first on state and the second signal indicates that a driver is maintaining a driver-operated brake control device in a brake-applied condition.

Some embodiments of the present invention have the feature that the first controller is not permitted to assume the first on state, and therefore cause a powertrain to develop drive torque and cause a vehicle to operate in accordance with a target speed value, unless at least the following conditions are met: (a) the first input signal is received indicating the first on state is to be assumed; and (b) a driver is maintaining a brake control device in the brake applied condition.

It is to be understood that in the first on state the first controller may generate the first controller powertrain signal so as to increase or decrease the amount of drive torque developed by a powertrain so as to cause the vehicle to operate in accordance with a target speed value. Typically, the first controller causes the vehicle to travel at a speed substantially equal to the target speed value. In sense embodiments the first controller causes the vehicle to travel at a speed substantially equal to the target speed value in the absence of one or more conditions requiring a lower speed to be assumed. In some embodiments the first controller may cause a reduction in vehicle speed in response to one or more terrain conditions, such as terrain surface roughness, surface coefficient of friction and/or one or more other parameters.

In some embodiments the first controller may cause the powertrain to develop negative drive torque by means of the first controller powertrain signal, for example by causing the powertrain to apply engine overrun braking or by causing an electric propulsion machine coupled in or to the powertrain to operate as a generator. The first controller may cause the powertrain to develop negative drive torque, for example in response to a reduction in an amount of powertrain torque demanded by the first controller so as to induce engine braking. In some embodiments the first controller may be configured to generate a powertrain signal corresponding to a prescribed amount of negative powertrain torque. A controller associated with the powertrain may be configured to control the powertrain to develop the prescribed amount of powertrain torque, whether positive or negative.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The speed controller may be implemented in software run on one or more processors. One or more other controllers may be implemented in software run on one or more processors, optionally the same one or more processors as the speed controller. Other arrangements are also useful.

Optionally the system may be configured to cause the first controller to assume the first on state in dependence at least in part on receipt on the first input signal after, and in overlapping coincidence with, the second signal.

Thus, the first controller may be configured to require the first input signal to be received whilst the driver is maintaining a driver-operated brake control device in a brake-applied condition.

Optionally the system may be configured to cause the first controller to assume the first on state in dependence at least in part on the first and second signals in further dependence on a vehicle speed signal indicative of vehicle speed.

Optionally the system may be configured to cause the first controller to assume the first on state in dependence at least in part on the first and second signals only when the vehicle speed signal indicates that a speed of the vehicle does not exceed a predetermined threshold speed.

Optionally the system may be configured wherein the predetermined threshold speed is one in the range from zero to 2 kph.

Thus in some embodiments the system may be configured to require a vehicle to be travelling at a speed not exceeding the predetermined threshold speed, optionally that the vehicle is substantially stationary, with a driver-operated brake control device in a brake-applied condition before the first controller may assume the first state. One or more further conditions may also be required to be met. For example, as discussed below, a driver may be required to cause the braking system to assume a brake-release condition by means of the brake control device before the first state may be assumed.

Optionally the system may be configured to cause the first controller to assume the first on state when the further condition is met that subsequent to receipt of the first signal, the second input signal provides an indication that the driver-operated brake control device has transitioned from the brake-applied condition to a brake-released condition in which the braking system does not apply a brake to one or more wheels.

Optionally the system may be configured to cause the first controller to assume the first on state in dependence on the first and second signals when at least the further condition is met that the vehicle speed did not exceed the predetermined threshold immediately prior to the second signal providing the indication of the transition to the brake-released condition.

This it is to be understood that in some embodiments the system may be configured wherein assumption of the first on state by the first controller when the vehicle speed is less than the predetermined threshold speed requires at least the following conditions to be met: (a) the first signal indicates assumption of the first on state is required; b) the user holds the vehicle in the brake-applied condition at a speed not exceeding the predetermined threshold speed by means of the driver-operated brake control device; and (c) the user then causes the vehicle to assume the brake-released condition, optionally by releasing a brake control device, such as a foot pedal or hand-operated lever. Other requirements may also have to be met in some embodiments before the first state may be assumed.

Optionally the system may be configured to cause the first controller to assume the first on state when at least the further condition is met that the second signal provides the indication of the transition to the brake-released condition within a predetermined time-out period period_timeout of the first signal providing the indication that the controller is required to assume the first on state.

Optionally the system may be configured wherein the predetermined time-out period period_timeout is one selected from amongst substantially 5 s, 10 s, 20 s and 30 s.

Optionally the first controller may be configured to assume, in dependence on a third input signal:
    a predetermined one of one or more on states, and
    the off state, being a state in which the first controller is substantially unresponsive to the first and second input signals.

Thus it is to be understood that in some embodiments the first controller may be prevented from assuming the first on state, and therefore causing a powertrain to develop positive drive torque so as to cause a vehicle to operate in accordance with a target speed value, in dependence at least in part on the first, second and third signals.

Optionally the system may be configured wherein the first controller is further configured to generate a first controller brake signal in order to cause application of a brake to one or more wheels thereby to cause a vehicle to operate in accordance with the target speed value.

Optionally the first controller may be configured to generate the first controller brake signal when in the first on state.

The first controller may be operable in a second on state in which the first controller is configured to generate the first controller brake signal and not the first controller powertrain signal in order to cause a vehicle to operate in accordance with the target speed value.

Optionally the system may be configured wherein when the first controller transitions from the off state to an on state, the first controller is configured to assume the second on state.

Thus in some embodiments if the first controller transitions from the off state to an on state in response to the third input signal, which may be generated in response to activation by a user of a 'master on' control such as pressing of a predetermined button, the first controller assumes the second on state. The first controller may then assume the first on state in the manner described above. Other arrangements are also useful.

Optionally the system may be configured wherein in response to receipt of the first input signal indicative that the controller is required to assume the first on state the controller is configured to set the target speed value to a predetermined value.

Optionally the system may be configured wherein the predetermined value corresponds to a minimum allowable target speed value.

Optionally the system may be configured wherein in response to receipt of the first input signal indicative that the controller is required to assume the first on state the controller is configured to increase the prevailing target speed value from a prevailing value each time the first input signal is received provided the input signal indicative that the controller is required to assume the first on state has already been received at least once within a preceding predetermined time period.

By prevailing value is meant a current or substantially instant value. The controller may increase the prevailing target speed value by a predetermined amount each time the first input signal is received.

Thus the system may be configured upon first receipt of the first input signal to set the rarest speed value to the minimum allowable value. If the first input signal is received again, within a predetermined time period, optionally the time-out period period_timeout, the system may cause an increase in the value of target speed. It is to be understood that the first input signal may be generated by a 'set +' input control such as a 'set +' button, which may be a physical button or a button displayed on a touchscreen of a HMI.

It is to be understood that if the first input signal is generated by holding an input control in an actuated position the controller may generate a plurality of successive first input signals, as if the input control were repeatedly actuated.

Optionally the system may be configured wherein the first input signal comprises a 'set +' input signal, the controller being configured to set the target speed value to a predetermined value in dependence on receipt of the 'set +' input signal.

The 'set +' input signal may be generated by user actuation of a 'set +' button. Other arrangements may also be useful.

It is to be understood that in some embodiments, the first input signal may be received in response to user actuation of a resume button or control. In response to receipt of the first input signal in response to user actuation of a resume button or control, the controller may be configured to set the target speed value to the most recently employed target speed value provided a target speed value is currently stored in a memory in which the controller stores the target speed value.

In some embodiments, if a user provides the 'set +' input after providing the resume input, the controller increments the current value of target speed each time the 'set +' input is received. The target speed may be increased by an amount dependent on the target speed, for example by (say) 0.5 kph or 0.5 mph when the target speed is below 5 kph, and by 1.0 kph or 1.0 mph when the target speed is at or above 5 kph. Other arrangements may also be useful.

Optionally the system may be configured wherein the at least a further condition comprises the condition that the second signal provides the indication of the transition to the brake-released condition within the predetermined time-cut period period_timeout of the most recent moment at which the first signal provided the indication that the controller is required to assume the first on state.

Thus each time the first signal is received within the predetermined time-out period period_timeout of the most recent moment at which the first signal provided the indication that the controller is required to assume the first on state, the time-out period is restarted.

Thus, each time the first input signal is received subsequent to the previous time the input signal was received within the preceding period period_timeout, the prevailing target speed value is changed.

In one aspect of the invention for which protection is sought there is provided a motor vehicle comprising a system according to another aspect.

In one aspect of the invention for which protection is sought there is provided a vehicle comprising a chassis, a body attached to said chassis, a plurality of wheels, a powertrain to drive said wheels, a braking system to brake said wheels, and a system according to another aspect of the invention.

In one aspect of the invention for which protection is sought there is provided a method of controlling a motor vehicle comprising:

causing a first, speed, controller to assume one of a plurality of respective on states, in a first on state the method comprising generating by means of the first controller a first controller powertrain signal to cause a powertrain to develop drive torque and cause a vehicle to operate in accordance with a target speed value, the method comprising causing the first controller to assume the first on state in dependence at least in part on receipt of a first input signal indicative that the controller is required to assume the first on state and a second signal indicative that a driver is maintaining a driver-operated brake control device in a brake-applied condition, being a condition in which a braking system of a vehicle is caused to apply a brake to one or more wheels.

In an aspect of the invention for which protection is sought there is provided a system comprising:

a first, controller operable to assume one of one or more on states, in a first on state the first controller being configured to generate a first controller powertrain signal in order to cause a powertrain to develop drive torque and cause a vehicle to operate in accordance with a target speed value, the system being configured to cause the first controller to assume the first on state in dependence at least in part on receipt of a first input signal indicative that the controller is required to assume the first on state and a second signal indicative that a driver is maintaining a driver-operated brake control device in a brake-applied condition, being a condition in which a braking system of a vehicle is caused to apply a brake to one or more wheels.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
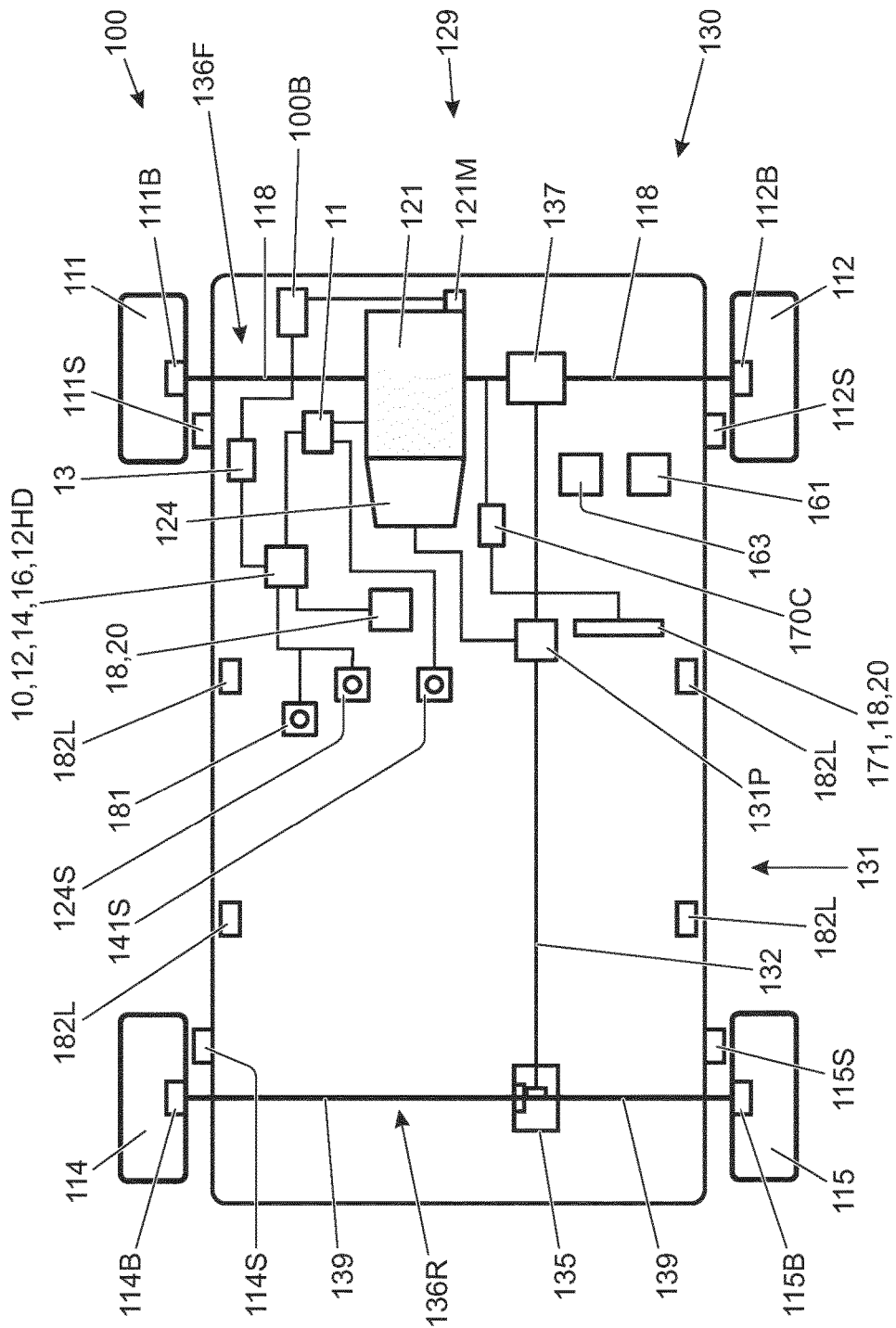
FIG. 1 is a schematic illustration of a vehicle according to an embodiment of the invention in plan view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111, 112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Reactive speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
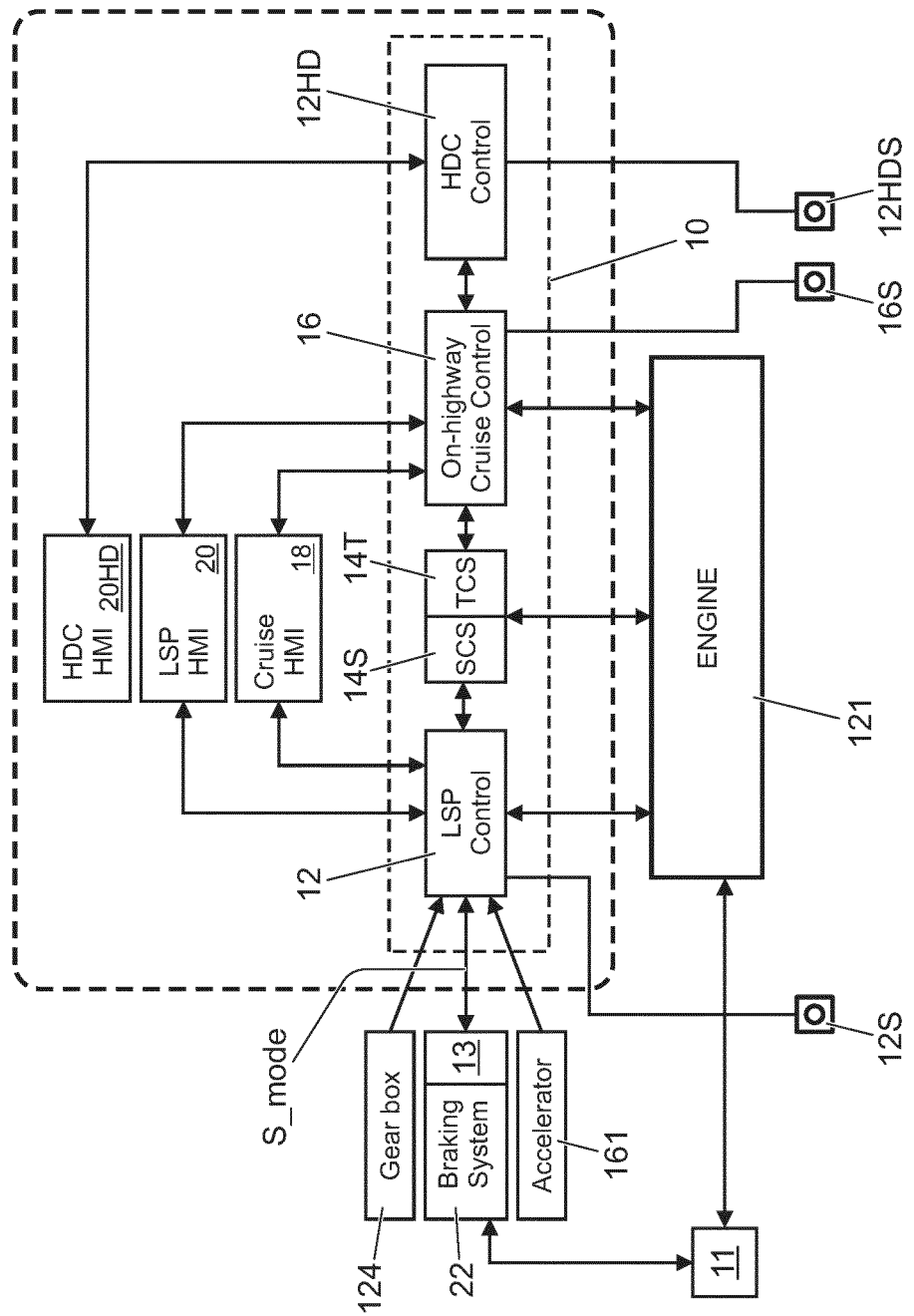
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by separate controllers.

Similarly, one or more of the controllers 10, 11, 13, 170C may be implemented in software run on a respective one or more computing devices such as one or more electronic control units (ECUs). In some embodiments two or more controllers may be implemented in software run on one or more common computing devices. Two or more controllers may be implemented in software in the form of a combined software module, or a plurality of respective modules each implementing only one controller.

One or more computing devices may be configured to permit a plurality of software modules to be run on the same computing device without interference between the modules. For example the computing devices may be configured to allow the modules to run such that if execution of software code embodying one module terminates erroneously, or the computing device enters an unintended endless loop in respect of one of the modules, it does not affect execution by one or more computing devices of software code comprised by a software module embodying the second controller.

It is to be understood that one or more of the controllers 10, 11, 13, 170C may be configured to have substantially no single point failure modes, i.e. one or more of the controllers may have dual or multiple redundancy. If is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roil stability control system or the like may also be present.

Figure 5:
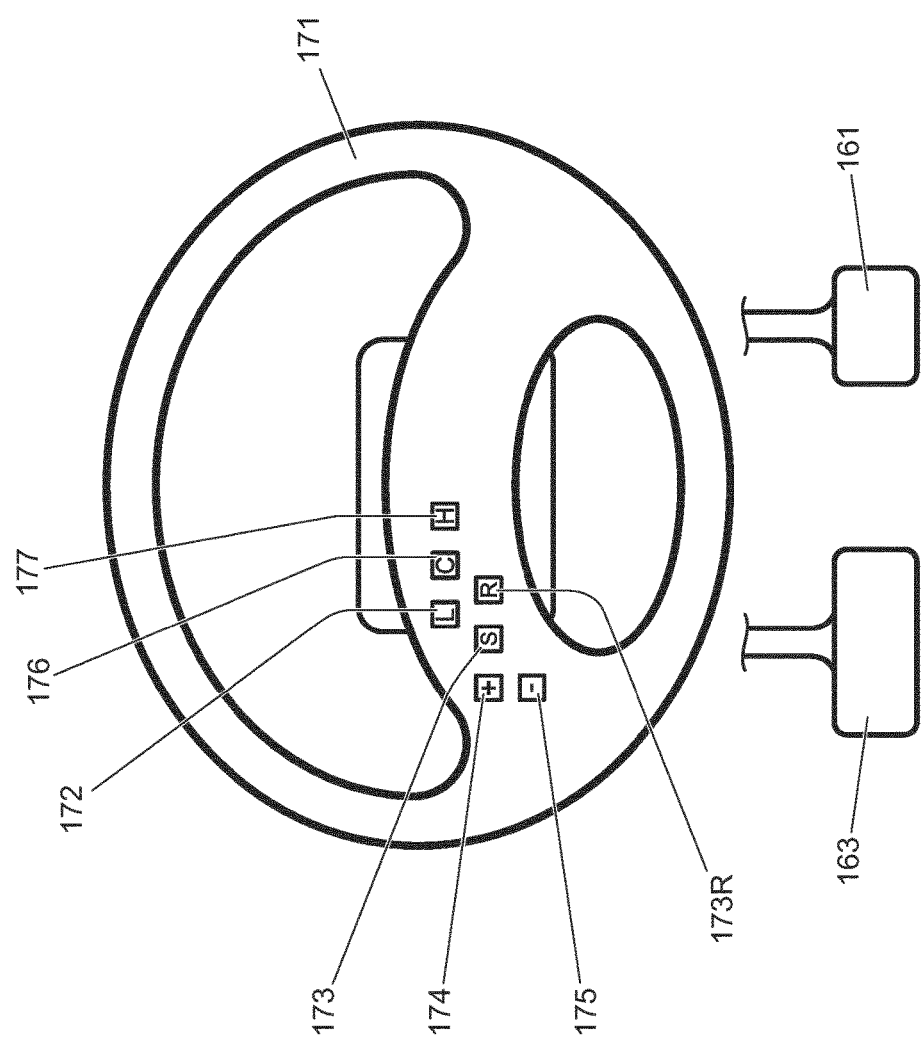
FIG. 5 illustrates a steering wheel and brake and accelerator pedals of a vehicle according to an embodiment of the present invention.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value Of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identify of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate although as noted elsewhere the HDC system 12HD is not able to cause positive drive torque to be applied by the powertrain 129 in order to reduce a rate of deceleration of the vehicle 100. The rate is set at 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

In the present embodiment the vehicle 100 is configured to assume one of a plurality of power modes PM at a given moment in time. In each power mode the vehicle 100 may be operable to allow a predetermined set of one or more operations to be performed. For example, the vehicle 100 may allow a predetermined one or more vehicle subsystems such as an infotainment system, a windscreen demist subsystem and a windscreen wiper control system to be activated only in a respective one or more predetermined power modes. In one or more of the power modes the vehicle 100 may be configured to inhibit one or more operations, such as turning on of the infotainment system.

The identity of the power mode in which the vehicle 100 is to operate at a given moment in time is transmitted to each controller 10, 11, 12, 13, 14, 16, 12HD, of the vehicle 100 by the central controller 10. The controllers respond by assuming a predetermined state associated with that power mode and that controller. In the present embodiment each controller may assume an ON state in which the controller is configured to execute computer program code associated with that controller, and an OFF state in which supply of power to the controller is terminated. In the present embodiment, the central controller 10 is also operable to assume a quiescent state. The quiescent state is assumed by the central controller 10 when the vehicle is in power mode PM0 and the controller 10 has confirmed that the other controllers 11, 12, 13, 14, 16, 12HD have successfully assumed the OFF state following receipt of the command to assume power mode PM0.

Figure 2:
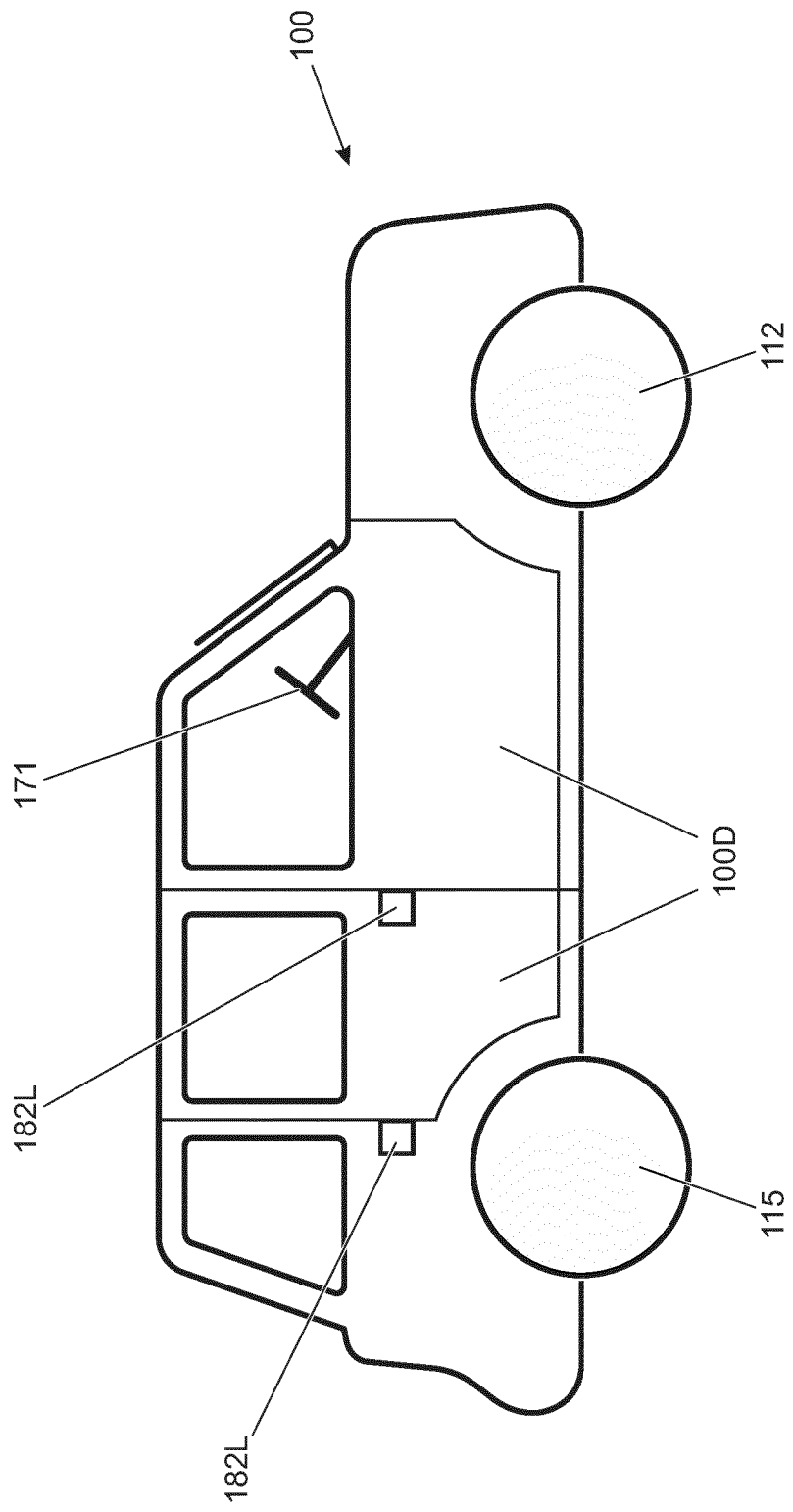
FIG. 2 shows the vehicle of FIG. 1 in side view.
Figure 6:
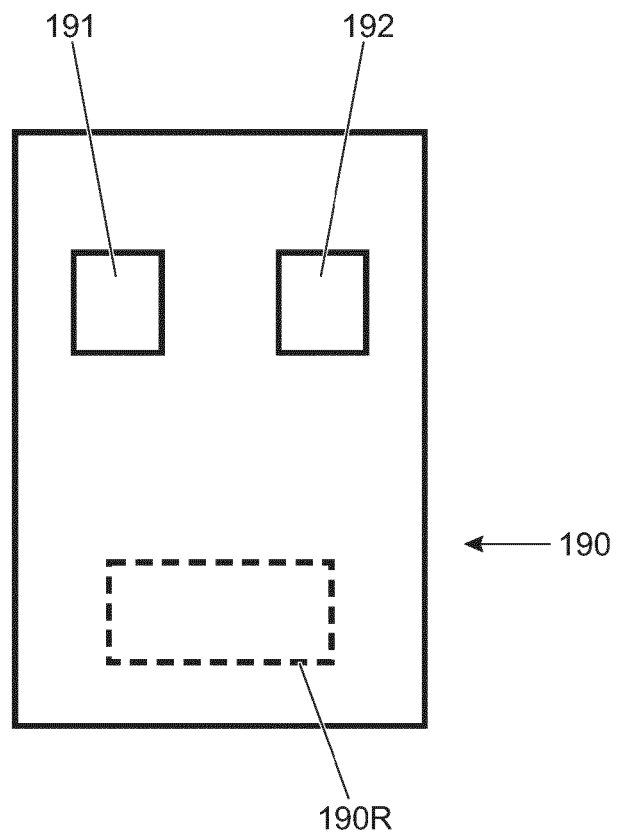
FIG. 6 is a schematic illustration of a known key fob for use with the vehicle of FIG. 1.

In the present embodiment the vehicle 100 is provided with a known key fob 190 (FIG. 6) that has a radio frequency identification device (RFID) 190R embedded therein. The key fob 190 has first and second control buttons 191, 192. The key fob 100 is configured to generate a respective electromagnetic signal in response to depression of the first or second control buttons 191, 192. The central controller 10 detects the electromagnetic signal by means of a receiver module forming part of the controller 10 and triggers locking or unlocking of door locks 182L of the vehicle 100. Each door 100D of the vehicle 100 is provided with a respective door lock 182L as shown in FIG. 2.

Pressing of the first control button 191 generates a door unlock signal, which triggers unlocking of the door locks 182L, whilst pressing of the second control button 192 triggers a door lock signal, which triggers locking of the door locks 182L.

When the controller 10 is in the quiescent state, consumption of power by the central controller 10 is reduced and the controller 10 monitors receipt of a door unlock signal from the key fob 190. It is to be understood that in some embodiments one or more vehicle controllers may be configured to remain in the ON or quiescent state, to allow one or more essential functions to be performed, when the vehicle is in power mode PM0. For example in vehicles fitted with an intruder alarm system an intruder alarm controller may be permitted to remain in the ON or a quiescent state pending detection of an intrusion. Upon detection of an intrusion the intruder alarm controller may cause the central controller 10 to assume the ON state if it is not already in that state.

The central controller 10 is also configured to transmit a radio frequency (RF) 'interrogation' signal that causes the RFID device 190R of the key fob 100 to generate an RF 'acknowledgement' signal in response to receipt of the interrogation signal. In the present embodiment the RFID device 190R is a passive device, not requiring battery power in order to generate the acknowledgement signal. The controller 10 is configured to detect the acknowledgment signal transmitted by the RFID device 190R provided the RFID device 190R is within range. By the term 'within range' is meant that the RFID device 190R or fob 190 is sufficiently close to the controller 10 to receive the interrogation signal and generate an acknowledgement signal that is detectable by the controller 10.

The vehicle 100 is also provided with a start/stop button 181. The start-stop button 181 is configured to transmit a signal to the central controller 10 when pressed in order to trigger an engine start operation, provided certain predetermined conditions are met. In response to pressing of the start stop button 181 the central controller 10 causes the vehicle 100 to be placed in a condition in which if the transmission 124 is subsequently placed in the forward driving mode D or reverse driving mode R, the vehicle 100 may be driven by depressing accelerator pedal 161. In the present embodiment, the central controller 10 is configured to perform a pre-start verification operation before commanding the powertrain controller 11 to trigger an engine start operation. In performing the pre-start verification operation the controller 10 verifies (a) that the vehicle 100 is in a predetermined power mode as described in more detail below, (b) that the controller 10 is receiving an acknowledgement signal from the key fob 190 in response to transmission of the interrogation signal by the controller 10, and (c) that the transmission 124 is in either the part P or neutral N modes. Thus, the controller 10 requires that the RFID device 190R is within range of the controller 10 before permitting an engine start. If any of conditions (a) to (c) are not met the controller causes the vehicle 100 to remain in its current power mode.

It is to be understood that the central controller 10 is configured to cause the vehicle 100 to assume a predetermined one of a plurality of power modes in dependence at least in part on actuation of a control button 191, 192 of the key fob 190 and actuation of the start/stop button 181. In some embodiments the vehicle 100 may be configured such that the central controller 10 responds to voice commands from a user in addition to or instead of signals received from the key fob 190.

The various power modes in which the vehicle 100 of the embodiment of FIG. 1 may be operated will now be described. As noted above, the key fob 190 is operable to cause the door locks 182L of the vehicle 100 to be locked and unlocked. When the doors 100D of the vehicle 100 (FIG. 2) are closed and the locks 182L are in the locked condition, the vehicle 100 assumes power mode PM0.

If the first button 191 of the key fob 190 is subsequently actuated, the controller 10 causes the door locks 182L to assume the unlocked condition. Once the door locks 182L are in the unlocked condition and the controller 10 detects the acknowledgement signal from the key fob 190, the controller 10 causes the vehicle 100 to assume power mode PM4. In power mode PM4 the controller 10 permits a predetermined number of electrical systems to become active, including an infotainment system. Power mode PM4 may also be referred to as a convenience mode or accessory mode. If a user subsequently presses the second button 192 of the key fob 190, the controller 10 causes the vehicle 100 to revert to power mode PM0.

If, whilst the vehicle is in power mode PM4 a user presses the starter button 181 and maintains the button 181 in a depressed condition, the controller 10 performs the pre-start verification operation described above. Provided conditions (a) to (c) of the pre-start verification operation are met, the controller 10 places the vehicle 100 in power mode PM6. When the vehicle 100 is in power mode PM6 the powertrain controller 11 is permitted to activate a starter device. In the present embodiment the starter device is a starter motor 121M. The powertrain controller 11 is then commanded to perform an engine start operation in which the engine 121 is cranked by means of the starter motor 121M to cause the engine 121 to start. Once the controller 10 determines that the engine 121 is running, the controller 10 places the vehicle 100 in power mode PM7.

In power mode PM6 the controller 10 disables certain non-critical electrical systems including the infotainment system. This is at least in part so as to reduce the magnitude of the electrical load on a battery 100B of the vehicle during cranking in order to permit an increase in the amount of electrical current available for engine starting. Isolation of non-critical electrical systems also reduces a risk of damage to the systems when a relatively large current drain is placed on the battery 100B by the starter motor 121M.

If whilst the vehicle is in power mode PM7, with the engine 121 running, a user again actuates the start/stop button 181, the controller 10 causes the powertrain controller 11 to switch off the engine 121 and the controller 10 causes the vehicle 100 to transition to power mode PM4. A user may then cause the vehicle to assume power mode PM0 by pressing the first button 191 of the key fob 190 provided each of the doors 100D is closed. It is to be understood that in some embodiments the user may trigger assumption of power mode PM0 whilst remaining in the vehicle 100 and locking the doors 181 by means of the key fob 190. In some embodiments the vehicle 100 may be configured to assume power mode PM0 regardless of whether the controller is receiving the acknowledgement signal from the key fob 190. Other arrangements are also useful.

It is to be understood that assumption of power mode PM0 by the vehicle 100 may be referred to as 'key off', whilst assumption of power mode PM4 from power mode PM0 may be referred to as 'key on'. A sequence of transitions of the vehicle from power mode PM0 to PM4, and back to power mode PM0, optionally including one or more transitions to power mode PM6 and power mode PM7 prior to assumption of power mode PM0, may be referred to as a 'key cycle'. Thus a key cycle begins and ends with the vehicle 100 in power mode PM0. In some embodiments, assumption of power mode PM6 or PM7 from power mode PM0 may be required in order to complete a key cycle, starting with power mode PM0.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In the present embodiment, at any given moment in time the LSP control system 12 is in one of a plurality of allowable 'on' modes (also referred to as conditions or states) selected from amongst an active or full function (FF) mode, a descent control (DC) mode, also referred to as an intermediate mode and a standby mode. The LSP control system may also assume an 'off' mode or condition. The active mode, DC mode and standby mode may be considered to be different 'on' modes or conditions of the vehicle, i.e. different modes in which the LSP control system is in an 'on' mode or condition as opposed to an 'off' mode or condition. In the off condition the LSP control system 12 only responds to pressing of the LSP selector button 172, which causes the LSP control system 12 to assume the on condition and the DC mode.

In the active or full function mode, the LSP control system 12 actively manages vehicle speed in accordance with the value of LSP set-speed, LSP_set-speed, by causing the application of positive powertrain drive torque to one or more driving wheels or negative braking system torque to one or more braked wheels.

In the DC mode the LSP control system 12 operates in a similar manner to that in which it operates when in the active mode except that the LSP control system 12 is prevented from commanding the application of positive drive torque by means of the powertrain 129. Rather, only braking torque may be applied, by means of the braking system 22 and/or powertrain 129. The LSP control system 12 is configured to increase or decrease the amount of brake torque applied to one or more wheels in order to cause the vehicle to maintain the LSP set-speed to the extent possible without application of positive drive torque. It is to be understood that, in the present embodiment, operation of the LSP control system 12 in the DC mode is very similar to operation of the HDC system 12HD, except that the LSP control system 12 continues to employ the LSP control system 12 set-speed value LSP_set-speed rather than the HDC control system set-speed value HDC_set-speed.

In the standby mode, the LSP control system 12 is unable to cause application of positive drive torque or negative brake torque to a wheel.

As noted above, in the 'off' mode the LSP control system 12 is not responsive to any LSP input controls except the LSP control system selector button 172. Pressing of the LSP control system selector button 172 when the system 12 is in the off mode causes the system 12 to assume the 'on' condition and the DC mode.

When the LSP control system 12 is initially switched on by means of the LSP selector button 172, the LSP control system 12 assumes the DC mode.

If whilst in DC mode the 'set +' button 174 is pressed, the LSP control system 12 sets the value of LSP_set-speed to the instant value of vehicle speed according to vehicle speed signal 36 (FIG. 4, discussed in more detail below) and assumes the active mode. If the vehicle speed is above 30 kph, being the maximum allowable value of LSP_set-speed, the LSP control system 12 remains in the DC mode and ignores the request to assume the active mode. A signal may be provided to the driver indicating that the LSP control system 12 cannot be activated due to the vehicle speed exceeding the maximum allowable value of LSP_set-speed. The signal may be provided by means of a text message provided on the LSP control HMI 18, by means of an indicator lamp, an audible alert or any other suitable means.

If the resume button 173R is depressed whilst in the DC mode, the LSP control system assumes the active mode provided a value of LSP_set-speed has been set in a memory of the LSP control system 12 since the LSP control system last assumed the on condition (i.e. the LSP control system 12 was last switched on), and the vehicle speed does not exceed 30 kph. If no value of LSP_set-speed has been set since the LSP control system 12 was last switched on, the LSP control system 12 remains in the DC mode. A signal may be provided to the driver indicating that the LSP control system 12 cannot be activated due to no value of LSP_set-speed having been set. The signal may be provided by means of a text message provided on the LSP control HMI 18, by means of an indicator lamp, an audible alert or any other suitable means.

If a value of LSP_set-speed has been set since the LSP control system 12 was last switched on and the resume button 173R is pressed, then if vehicle speed is above 30 kph but less than or substantially equal to 50 kph when the resume button 173R is pressed the LSP control system 12 remains in the DC mode until vehicle speed falls below 30 kph. In the DC mode, provided the driver does not depress the accelerator pedal 161 the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active mode in which it is operable to apply positive drive torque via the powertrain 129, as well as negative torque via the powertrain 129 (via engine braking) and brake torque via the braking system 22 in order to control the vehicle in accordance with the LSP_set-speed value.

With the LSP control system 12 in the active mode, the user may increase or decrease the value of LSP_set-speed by means of the '+' and '−' buttons 174, 175. In addition, the user may optionally also increase or decrease the value of LSP_set-speed by lightly pressing the accelerator or brake pedals 161, 163 respectively. In some embodiments, with the LSP control system 12 in the active mode the '+' and '−' buttons 174, 175 may be disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful such as 30-120 kph or any other suitable range of values.

ft is to be understood that if the LSP control system 12 is in the active mode, operation of the cruise control system 16 is inhibited. The two speed control systems 12, 16 therefore operate independently of one another, so that only one can be operable at any one time.

In some embodiments, the cruise control HMI 18 and the LSP control BMI 20 may be configured within the same hardware so that, for example, the speed selection is input via the same hardware, with one or more separate switches being provided to switch between the LSP control HMI 20 and the cruise control HMI 18.

When in the active mode, the LSP control system 12 is configured to command application of positive powertrain torque and negative brake torque, as required, by transmitting a request for (positive) drive torque in the form of a powertrain torque signal and/or a request for (negative) brake torque in the form of a brake torque signal to the brake controller 13. The brake controller 13 arbitrates any demand for positive powertrain torque, determining whether the request for positive powertrain torque is allowable. If a request for positive powertrain torque is allowable the brake controller 13 issues the request to the powertrain controller 11. In some embodiments, the request for brake torque may correspond to an amount of brake torque (or brake fluid pressure) to be developed by the braking system 22. In some alternative embodiments the request for brake torque may be for an amount of negative torque to be applied to one or more wheels. The brake controller 13 may in some embodiments determined whether the requested negative torque is to be supplied by means of powertrain braking alone, for example engine overrun braking, by means of powertrain braking and brake torque developed by the braking system 22, or by means of the braking system 22 alone. In some embodiments the brake controller 13 or LSP control system 12 may be configured to cause a required amount of net negative torque to be applied to one or more wheels by applying negative torque by means of the braking system 22 against positive drive torque generated by the powertrain 129. Application of positive drive torque generated by means of the powertrain 129 against negative brake torque generated by means of the braking system 22 may be made in order to reduce wheel flare when driving on surfaces of relatively low surface coefficient of friction such as during off-road driving. By wheel flare is meant excessive wheel slip as a result of the application of excess positive net torque to a wheel.

In the present embodiment the brake controller 13 also receives from the LSP control system 12 a signal S_mode indicative of the mode in which the LSP control system 12 is operating, i.e. whether the LSP control system 12 is operating in the active mode, DC mode, standby mode or off mode.

If the brake controller 13 receives a signal S_mode indicating that the LSP control system 12 is operating in the DC mode, standby mode or off mode, the brake controller 13 sets a powertrain torque request inhibit flag in a memory thereof. The powertrain torque request inhibit flag indicates that positive torque requests to the powertrain controller 11 from the brake controller 13 in response to positive torque requests from the LSP control system 12 are forbidden. Accordingly, if a request for positive powertrain torque is received by the brake controller 13 from the LSP control system 12 whilst the LSP control system 12 is operating in the DC mode, standby mode or off mode, the positive torque request is ignored by the brake controller 13.

In some embodiments, the powertrain controller 11 is also provided with signal S_mode indicating the mode in which the LSP control system 12 is operating. If the LSP control system 12 is operating in a mode other than the active mode, such as the DC mode, standby mode or off mode, positive powertrain torque requests received as a consequence of a command from the LSP control system 12 are ignored by the powertrain controller 11.

In some embodiments, if the powertrain controller 11 receives a request for positive powertrain torque from the brake controller 13 as a consequence of a command from the LSP control system 12 and the request is received more than a predetermined period after the LSP control system 12 has transitioned to a mode other than the active mode, the powertrain controller 11 causes the LSP control system 12 to assume a disabled off mode. In the disabled off mode the LSP control system 12 is effectively locked into the off condition or mode for the remainder of the current key cycle and the LSP control system 12 does not assume the DC mode in response to pressing of the LSP selector button 172. The predetermined period may be any suitable period such as 50 ms, 100 ms, 500 ms, 1000 ms or any other suitable period. The period may be set to a value such that any delay in receipt of a positive torque request issued by the LSP control system 12 immediately prior to a transition from the active mode to a mode other than the active mode (and in which positive torque requests are not permitted) that is consistent with normal system operation will not trigger a transition to the disabled off mode. However, the powertrain controller 11 is configured such that any request for positive powertrain torque received by the powertrain cent roller 11 as a consequence of a request issued by the LSP control system 12 after assuming a mode other than the active mode (and in which positive torque requests are not permitted) will trigger a transition to the disabled off mode.

It is to be understood that other arrangements may also be useful. For example, in some embodiments, in the disabled off mode the LSP control system 12 may be configured not to respond to the LSP selector button 172 by assuming the DC mode until after the vehicle has transitioned from power mode PM7 to power mode PM4. As described above, a transition from power mode PM7 to power mode PM4 may be accomplished by depressing the start/stop button 124S. When the vehicle 100 is subsequently restarted and assumes power mode PM7, the LSP control system 12 may be permitted to assume operation in the active mode as required.

It is to be understood that sense vehicles may be provided with known automatic engine stop/start functionality. In vehicles with this functionality, the powertrain controller 11 is contoured to command stopping and starting of the engine 121 according to a stop/start control methodology when the vehicle 100 is being held stationary by means of brake pedal 163 with the transmission in the drive mode D. The process of automatically commanding stopping and restarting of the engine 121 may be referred to as an automatic stop/start cycle. In vehicles having automatic engine stop/start functionality, the controller 10 may be configured to cause the vehicle 100 to assume a power mode PM6A when the engine 121 is stopped during a stop/start cycle. Power mode PM6A is similar to power mode 6, except that disabling of certain vehicle systems such as the infotainment system is not performed when in power mode PM6A. In power mode PM6A, the powertrain controller 11 is configured to restart the engine 121 upon receipt of a signal indicating a user has released the make pedal 163. It is to be understood that in some embodiments, a vehicle 100 may be configured to require an engine restart before the LSP control system 12 may exit the DC fault mode but an engine restart as part of an automatic stop/start cycle may be configured not to quality as an engine restart permitting the system 12 to exit the DC fault mode. In some embodiments therefore, a transition from power mode PM7 to cower mode PM6A and back to power mode PM7 does not permit the LSP control system 12 to exit the disabled off mode.

In some embodiments the LSP control system 12 may be configured such that it can assume one of a number of different further modes such as:
(i) DC fault mode
(ii) DC fault mode fade-out mode
(iii) DC mode fade-out mode
(iv) Active standby mode
(v) DC Standby mode The DC fault mode corresponds to the DC mode except that if the DC fault mode is assumed by the LSP control system 12, the LSP control system 12 is unable subsequently to assume the active mode for the remainder of the current key cycle. Thus, when the next key-on procedure is performed, following the next key-off procedure, the LSP control system 12 is permitted to assume the active mode when required. The vehicle 100 may be configured wherein the LSP control system 12 may assume the DC fault mode if a fault is detected indicating that the LSP control system 12 should not be permitted to request positive powertrain drive torque but where it is determined that it may be desirable for the benefits of DC mode to be enjoyed. Thus a transition from active mode to DC fault mode may be preferable to a transition to the off mode, particularly when negotiating off road conditions, in the event of a relatively minor fault in respect of the LSP control system 12.

In some embodiments, if a transition to DC fault mode occurs with more than a predetermined frequency, the LSP control system 12 may become latched in the DC fault mode until a reset procedure is performed requiring action other than a key-off and subsequent key-on procedure in order to permit the active mode to be assumed again. In some embodiments, the LSP control system 12 may require a predetermined code to be provided to it. In some embodiments, the LSP control system 12 may be configured to receive the code via a computing device external to the vehicle 100 that temporarily communicates with the LSP control system 12 in order to provide the code. The computing device may be a device maintained by a vehicle servicing organisation such as a dealer certified by a manufacturer of the vehicle 100. The computing device may be in the form of a laptop or other computing device, and be configured to communicate wirelessly with the LSP control system 12 or via a wired connection.

The predetermined frequency may be defined in terms of a predetermined number of occurrences in a predetermined number of key cycles, or a predetermined distance driven, or be time based such as a predetermined number of occurrences in a predetermined period in which the vehicle is in power mode 7 (or power mode 6A in addition to power mode 7, in the case of a vehicle with stop/start functionality) over one or more key cycles, or a predetermined number of occurrences in a given calendar period, such as a day, a week, a month or any other suitable frequency.

The DC fault mode fade-out is a mode assumed by the LSP control system 12 when transitioning from the DC fault mode to an off mode such as disabled off, unless an immediate ('binary') transition to an off mode is required in which case the DC fault mode fade-out mode is not assumed. Thus, under certain conditions, rather than abruptly terminate commanding application of brake torque by means of the braking system 22 when ceasing operation in the DC fault mode and transitioning to an off mode such as 'off' or 'disabled off', the LSP control system 12 gradually fades out the application of any brake torque applied by the biasing system 22 as a consequence of being in the DC fault mode, because assuming the off or disabled off mode. This is at least in part so as to allow a driver time to adapt to driving without the system 12 applying brake torque automatically.

Similarly, if the LSP control system 12 transitions from the DC mode to a mode in which the LSP control system 12 is unable to command application of brake torque such as the standby mode, off mode or disabled off mode, the LSP control system 12 may assume the DC fade-out mode as an intermediate mode. In the DC fade-out mode, like the DC fault mode fade-out mode, the LSP control system 12 gradually reduces the amount of any brake torque commanded by the LSP control system 12, before assuming the target mode such as standby mode, off mode or disabled off mode.

The active standby mode is a mode assumed by the LSP control system 12 from the active mode if the driver over-rides the LSP control system 12 by depressing the accelerator pedal 161 to increase vehicle speed. If the driver subsequently releases the accelerator pedal with vehicle speed within the allowable range for the LSP control system 12 to operate in the active mode (i.e. a speed in the range 2-30 kph), the LSP control system 12 resumes operation in the active mode.

The DC standby mode is a mode assumed by the LSP control system 12 if whilst operating in the DC mode the driver over-rides the LSP control system 12 by depressing the accelerator pedal 161. If the driver subsequently releases the accelerator pedal, then when vehicle speed is within the allowable range for the LSP control system 12 to operate in the DC mode (i.e. a speed in the range 2-30 kph), the LSP control system 12 resumes operation in the DC mode. Other arrangements are also useful. In some embodiments the LSP control system 12 may be configured to assume DC mode from the DC standby mode and cause application of brake torque to slow the vehicle 100 when a driver releases the accelerator pedal 161 even at speeds above 30 kph. In some embodiments the LSP control system 12 may be configured to cause application of brake torque at speeds of up to 50 kph, 80 kph or any other suitable speed in order to cause vehicle speed to reduce to the LSP target speed LSP_set-speed. The LSP control system 12 may be configured to take into account negative torque applied by a powertrain due for example to engine over-run braking in determining an amount of brake torque required in order to cause a vehicle to slow at a desired rate. The LSP control system 12 may be configured to cause a vehicle to slow at a desired rate according to a predetermined deceleration profile.

In some embodiments, if the powertrain controller 11 receives a request for positive powertrain torque from the brake controller 13 as a consequence of a command from the LSP control system 12 and the LSP control system 12 is in the DC mode, the powertrain controller 11 causes the LSP control system 12 to assume the DC fault mode if the positive torque request is received more than a predetermined period after the LSP control system 12 has transitioned to the DC mode. As noted above, in the DC fault mode the LSP control system 12 is permitted to cause application of brake torque by the braking system 22 to control vehicle speed but is prevented from assuming the active or FF mode for the remainder of the current key cycle. In these circumstances, the LSP control system 12 assumes the DC fault mode substantially immediately with no requirement to blend the transition between the DC mode and DC fault mode.

As noted above, the predetermined period may be any suitable period such as 50 ms, 100 ms, 500 ms, 1000 ms or any other suitable period. The period may be set to a value such that any inherent system delay in receipt by the powertrain controller 11 of a torque request from the brake controller 13 as a consequence of a request issued by the LSP control system 12 prior to a transition from the active mode to the DC mode will not trigger a transition to the DC fault mode. It is to be understood that by inherent system delay is meant a delay in signal receipt that occurs during normal operation, for example due to a requirement to synchronise timing signals, or to transmit commands from the LSP control system 12 to the powertrain controller 11 at predetermined intervals as part of an inter-controller communications protocol.

In some embodiments, if the powertrain controller 11 receives a request for positive powertrain torque from the brake controller 13 as a consequence of a command from the LSP control system 12 and the LSP control system 12 is in the DC fault mode or DC fault mode fade out mode only, the powertrain controller 11 causes the LSP control system 12 to assume the disabled off mode if the positive torque request is received more than a predetermined period after the LSP control system 12 has transitioned to the DC fault mode or DC fault mode fade out mode. In the present embodiment the predetermined period is a period of 500 ms. However the predetermined period may be any suitable period such as 50 ms, 100 ms, 1000 ms or any other suitable period. The LSP control system 12 may be configured substantially abruptly to terminate application of any negative (brake) torque requested by the LSP control system 12 when the transition to the disabled off mode is commanded even if the system 12 is in the processes of fading out any negative brake torque that is being applied as a result of a request issued by the LSP control system 12

In some embodiments, in addition or instead, if the powertrain controller 11 receives a request for positive powertrain torque from the brake controller 13 as a consequence of a command from the LSP control system 12 and the signal S_mode indicates that the LSP control system 12 is in the DC mode, DC standby mode, DC mode fade-out mode or active standby mode, the powertrain controller 11 causes the LSP control system 12 to assume the disabled off mode if the positive torque request is received over a sustained period of more than a predetermined period. In the present embodiment the predetermined period is substantially 500 ms. However the predetermined period may be any suitable period such as 100 ms, 1000 ms or any other suitable period. The LSP control system 12 is configured gradually to cause fade-out of any negative (brake) torque being applied as a consequence of a command from the LSP control system 12 when the transition to the disabled off mode is commanded. The fade-out of brake torque may be accomplished by assuming the DC mode fade-out mode or DC fault mode fade-out mode if they have not already been assumed.

In some embodiments, the LSP control system 12 is caused to assume the disabled off mode if the powertrain controller 11 receives a request for positive powertrain torque from the brake controller 13 as a consequence of a command from the LSP control system 12 and signal S_mode indicates that the LSP control system 12 is in the DC fault mode or DC fault mode fade-out mode, as well as when the signal indicates the LSP control system 12 is in the DC mode, DC standby mode, DC mode fade-out mode or active standby mode.

It is to be understood that in some embodiments, instead of gradually fading out negative brake torque, the LSP control system 12 may be configured to abruptly terminate application of any negative brake torque as a consequence of a command by the LSP control system 12. Thus, if a request for positive powertrain torque is received over a sustained period of more than the predetermined period when the LSP control system 12 is in the DC mode, DC standby mode, DC fault mode, DC mode fade-out mode, DC fault mode fade-out mode or active standby mode the system may abruptly terminate application of brake torque caused by the LSP control system 12. It is to be understood that the braking system 12 continues to respond to driver brake commands via the brake pedal 163.

It is to be understood that in the present embodiment if a driver switches off the LSP control system 12 manually, the LSP control system 12 is configured gradually to cause fade-out of any negative (brake) torque being applied as a consequence of a command from the LSP control system 12. This feature has the advantage that vehicle composure may be enhanced.

Figure 4:
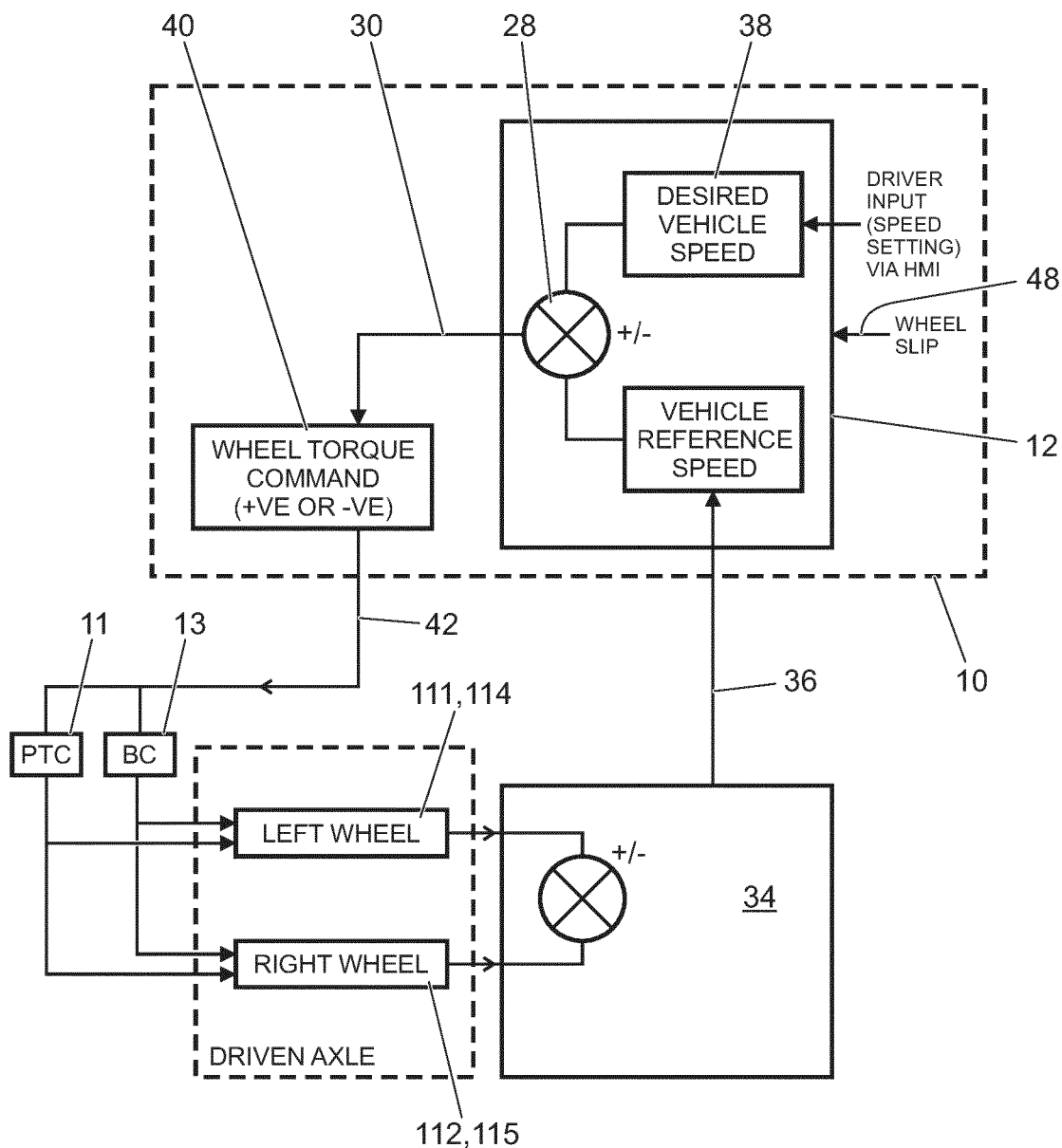
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed calculator 34 provides a vehicle speed signal 36 indicative of vehicle speed to the LSP control system 12. The speed calculates 34 determines vehicle speed based on wheel speed signals provided by wheel speed sensors 111S, 112S, 114S, 115S. The LSP control system 12 includes a comparator 28 which compares the LSP control system set-speed LSP_set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing the amount of any positive powertrain torque delivered to a wheel, by increasing the amount of any negative powertrain torque delivered to a wheel, for example by reducing an amount of air and/or fuel supplied to art engine 121, and/or by increasing a braking force on a wheel. It is to be understood that in some embodiments in which a powertrain 129 has one or more electric machines operable as a generator, negative torque may be applied by the powertrain 129 to one or more wheels by means of the electric machine. As noted above negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the brake controller 13. The brake controller 13 in turn controls a net torque applied to the vehicle wheels 111-115 by commanding application of brake torque via the brakes 111B, 112B, 114B, 115B and/or positive drive torque by commanding powertrain controller 11 to deliver a required amount of powertrain torque. The net torque may be increased or decreased depending on whether the evaluator unit 40 demands positive or negative torque. In order to cause application of the necessary positive or negative torque to the wheels, the brake controller 13 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle 100 at the required speed, but in another embodiment torque may be applied to the wheels collectively to maintain the required speed. In some embodiments, the powertrain controller 11 may be operable to control an amount of torque applied to one or more wheels at least in part by controlling a driveline component such as a rear drive unit, front drive unit, differential or any other suitable component. For example, one or more components of the driveline 130 may include one or more clutches operable to allow an amount of torque applied to wheels of a given axle to be controlled independently of the torque applied to wheels of another axle, and/or the amount of torque applied to one or more individual wheels to be controlled independently of other wheels. Other arrangements are also useful.

Where a powertrain 129 includes one or more electric machines, for example one or more propulsion motors and/or generators, the powertrain controller 11 may be operable to modulate or control the amount of torque applied to one or more wheels at least in part by means of the one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation of the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value, it is to be understood therefore that the LSP control system 12 is configured differently to the cruise control system 16, for which a wheel slip event has the effect of overriding the cruise control function so that manual operation of the vehicle 100 must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data Indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the LSP function by depressing the accelerator pedal 161 and/or brake pedal 163 to adjust the vehicle speed in a positive or negative sense. However, absent any override by a user, in the event that a wheel slip event is detected via signal 48, the LSP control system 12 remains active and control of vehicle speed by the LSP control system 12 is not terminated. As shown in FIG. 4, this may be implemented by providing a wheel slip event signal 48 to the LSP control system 12 which is then managed by the LSP control system 12 and/or brake controller 13. In the embodiment shown in FIG. 1 the SCS 14S generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can foe a difficult and often stressful experience for the driver and may result in an uncomfortable ride.

The vehicle 100 is also provided with additional sensors (not shown) which are representative of a variety of different parameters associated with vehicle motion and status. The signals from the sensors provide, or are used to calculate, a plurality of driving condition indicators (also referred to as terrain indicators) which are indicative of the nature of the terrain conditions over which the vehicle is travelling. Suitable sensor data may be provided by inertial systems unique to the LSP or HDC control system 12, 12HD or systems that form part of another vehicle sub-system such as an occupant restraint system or any other sub-system which may provide data from sensors such as gyros and/or accelerometers that may be indicative of vehicle body movement and may provide a useful input to the LSP and/or HDC control systems 12, 12HD.

The sensors on the vehicle 100 include sensors which provide continuous sensor outputs to the VCU 10, including wheel speed sensors, as mentioned previously and as shown in FIG. 1, and other sensors (not shown) such as an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used. Other sensors may be useful in addition or instead in some embodiments.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499252, the contents of each of which is incorporated herein by reference.

The nature of the terrain over which the vehicle is travelling (as determined by reference to the selected control mode) may also be utilised in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the ease of uneven or rough surfaces. If the system 12 selects a set-speed that differs from the user-selected set-speed, a visual indication of the speed constraint is provided to the user via the LSP HMI 20 to indicate that an alternative speed has been adopted.

As described above, the LSP control system 12 is configured to assume an active mode in which the LSP control system 12 causes a vehicle 100 to operate in accordance with a set-speed value LSP_set-speed. The LSP control system 12 is configured to, upon a transition from an LSP control system off state to an LSP control system 12 on state, i.e. during the initialisation of the LSP control system from an off condition, to assume the active mode when the LSP control system 12 is in the on condition, in dependence at least in part on signals input to the VCU 10. A selection of the signals input to the VCU 10 are illustrated schematically in FIG. 7.

The VCU 10 monitors an LSP selector signal line 172S that carries a signal indicative whether the LSP control system selector button 172 is being depressed. If the signal line 172S indicates that the selector button 172 is being depressed, the VCU 10 controls the LSP control system 12 to toggle between the on condition and the off condition each time the LSP control system selector button 172 is passed. Under certain conditions, if the LSP control system is in the off condition the VCU 10 does not allow the LSP control system 12 to assume the on condition if another speed control system such as the cruise control system 16 or HD control system 14HD is in an active condition, although other arrangements are also useful.

Figure 7:
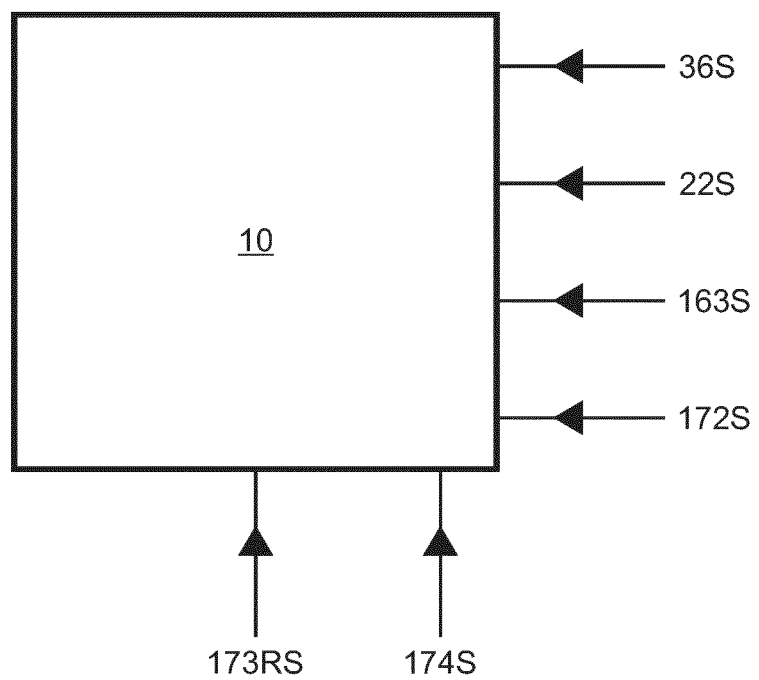
FIG. 7 is a flowchart illustrating operation of a vehicle according to an embodiment of the present invention.

Provided the LSP control system is in the on condition, the LSP control system 12 monitors, inter alia, the following signal lines, also illustrated in FIG. 7 as being coupled to the VCU 10:

(a) a vehicle speed signal line 36S carrying vehicle speed signal 36;
(b) a brake pressure signal line 22S carrying a signal indicative of a pressure of brake fluid in braking system 22;
(c) a brake pedal activation signal line 163S carrying a signal indicative of a movement of brake pedal 163; and
(d) a 'set +' signal line 174S carrying a signal indicative of whether the 'set +' button 174 is being actuated at a given moment in time; and
(e) a resume signal line 173RS carrying a signal indicative of whether resume button 173R is being actuated at a given moment in time.

During a transition from an off state to an on state, as there is no previous set speed recorded the resume button 173R has no function until after a set speed has been set and the set speed recorded to a memory of the LSP control system 12.

If the LSP control system 12 is in the on condition but is not in the active mode and vehicle speed signal line 36S indicates that vehicle speed does not exceed a predetermined value, the LSP control system 12 determines if the brake pedal 163 has been pressed. In a preferred embodiment, to ensure a positive identification the LSP control system 12 monitors the pressure of brake fluid in the braking system 22 by means of signal line 22S and movement of brake pedal 163 by means of signal line 163S, although it will be appreciated that just one of the signals could be used. If the LSP control system 12 determines that the pressure of brake fluid exceeds a predetermined brake pressure value and the brake pedal 163 is depressed, the LSP control system 12 monitors the 'set +' signal line 174S to determine if the set + button 174 has been pressed and resume signal line 173RS to determine if the resume button 173R has been pressed. It is to be understood that if the pressure of brake fluid exceeds the predetermined brake pressure value and the brake pedal 163 is depressed, the LSP control system 12 can positively determine from two independent sources the depression of the brake pedal 163. Other methods of determining that a user is causing the brake pressure to exceed the predetermined value are also useful. For example, in some embodiments the LSP control system 12 may monitor a signal indicative of whether a vehicle system other than the brake pedal 163 is active and causing the brake pressure to exceed the predetermined value. If such a system is not active the LSP control system 12 may determine that the user is causing the brake pressure to exceed the predetermined value by means of the brake pedal 163.

In the present embodiment the predetermined vehicle speed value is 2 kph. However it is to be understood that other vehicle speed values are also useful such as substantially 0 kph, 5 kph or any other suitable value.

In the present embodiment the predetermined brake pressure value is 40 bar. However it is to be understood that other brake pressure values are also useful such as substantially 10 bar, 20 bar, 60 bar or any other suitable value.

If the 'set +' signal line 174S indicates the 'set +' button 174 has been actuated or the resume signal line 173RS indicates the resume button 173R has been actuated, and the LSP control system 12 determines that the brake pedal is still pressed, the LSP control system 12 remains in its current mode such as DC mode, assumes an 'active-armed' condition and resets a timer associated with the LSP control system 12. The active-armed condition is assumed by setting an 'active-armed' condition flag to logic level 1 instead of a value of 0, a value of 0 indicating the LSP control system 12 is not in the 'active-armed' condition. In the active-armed condition the LSP control system 12 is configured to assume the active condition when it is determined by the LSP control system 12 that the brake has been released before the timer indicates that a predetermined period of time has expired since the timer was reset. In the preferred embodiment determining that the brake pedal has been released may comprise determining:

(a) the signal carried by brake pedal position signal line 163S indicates that the brake pedal 163 is no longer being depressed, i.e. the pedal 163 has been released, and
(b) the brake pressure signal line 22S carries a signal indicating brake pressure is less than a predetermined release value.

In the present embodiment the predetermined period of time is a period of 5 s. However it is to be understood that other values of predetermined period may be useful, for example a value in the range of 2 seconds to 60 seconds or any other suitable period of time.

In the present embodiment the predetermined release value of brake pressure is 5 bar. Other values may also be useful such as 2 bar, 10 bar, 15 bar or any other suitable value.

If it is determined that the brake pedal has not been released before the predetermined period expires, the LSP control system 12 exits the active-armed condition, i.e. the active-armed condition flag is set to logic 0.

If, on the other hand it is determined that the brake pedal is released within the predetermined period, the LSP control system 12 assumes the active condition, sets the active-armed condition flag to logic 0, and sets the value of LSP_set-speed to the instant vehicle speed according to the vehicle speed signal 36 carried by vehicle speed signal line 36S. The LSP control system 12 then causes the vehicle 100 to operate in accordance with the value of LSP_set-speed in the manner described above. If the 'set +' button is pressed multiple times prior to user release of the brakes the LSP control system sets the LSP set-speed to the instant vehicle speed coincident with the first press of the 'set +' button, and increments the set speed by a predetermined amount upon each subsequent press.

If on the other hand conditions (a) and (b) are met and the LSP control system 12 determines that the resume button 173R was actuated more recently than the 'set +' button 174, the LSP control system 12 assumes the active condition and controls the vehicle 100 to operate in accordance with the value of LSP_set-speed stored in memory. If no value of LSP_set-speed is currently stored, the LSP control system 12 does not assume the active mode in response to pressing of the resume button 173R, and remains in the instant mode.

If whilst the LSP control system 12 is in the active-armed condition the LSP control system 12 determines that one of the 'set +' button 174 or resume button 173R is again depressed, the LSP control system remains in the active-armed condition and resets the timer.

Figure 8:
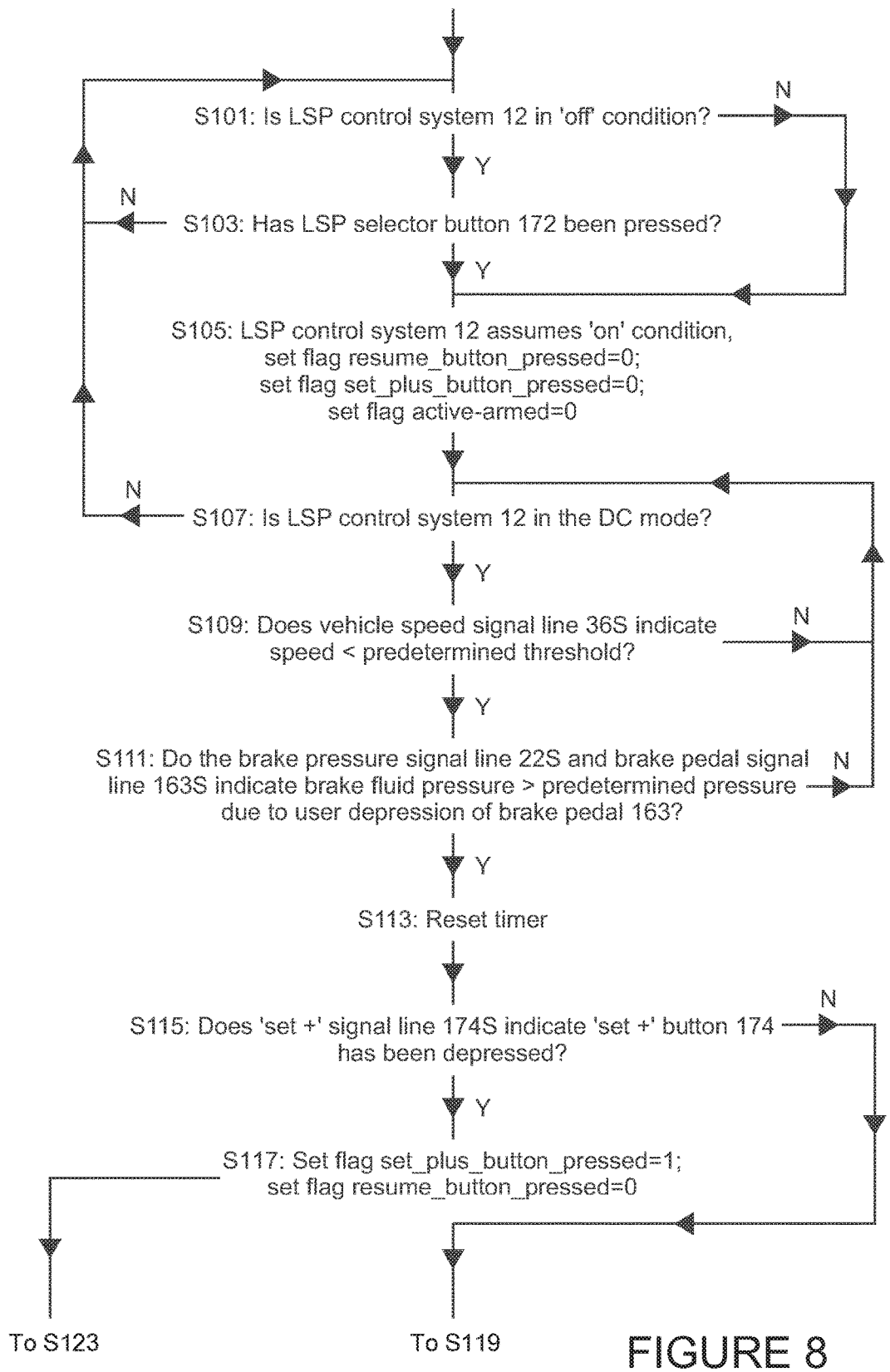
FIG. 8 is a flowchart illustrating operation of a vehicle according to an embodiment of the present invention.

FIG. 8 illustrates a method of operation of a vehicle control system according to an embodiment of the present invention.

At step S101 the VCU 10 checks that the LSP control system 12 is in the off condition. If the LSP control system 12 is in the off condition the VCU continues at step S103, else the VCU 10 continues at step S105.

At step S103 the VCU checks if the LSP selector button 172 has been pressed. If the selector button 172 has been pressed the VCU 10 continues at step S105 else the VCU 10 continues at step S101.

At step S105 the LSP control system 12 assumes the 'on' condition. As part of an initialisation process, the LSP control system sets three flags to a zero condition. These are a flag resume_button_pressed, a flag set_plus_button_pressed, and a flag active-armed. As part of the initialisation process the LSP control system also assumes the DC mode.

The LSP control system 12 then continues at step S107. At step S107 the LSP control system 12 checks that it is still in the DC mode. If the LSP control system is not in the DC mode the method continues at step S107 else the method continues at step S109.

At step S109 the LSP control system 12 checks whether vehicle speed signal line 36S indicates that the vehicle speed is less than a predetermined threshold value. In the present embodiment the predetermined threshold speed is substantially 2 kph although other values may also be useful. If the speed is not less than the predetermined threshold value the LSP control system 12 continues at step S107 else the LSP control system 12 continues at step S111.

At step S111 the LSP control system 12 checks whether a brake signal line 22S and brake pedal signal line 163S indicate that the pressure of brake fluid in a braking system 22 is greater than a predetermined pressure due to user depression of the brake pedal 163. As described above, in the present embodiment the LSP control system 12 accomplishes this by checking that the position of the brake pedal 163 is consistent with the prevailing pressure of brake fluid in the braking system 22 although other methods are also useful.

If the pressure of brake fluid in a braking system 22 is greater than a predetermined pressure due to user depression of the brake pedal 163, the LSP control system 12 continues at step S113 else the LSP control system 12 continues at step S107.

At step S113 the LSP control system 12 resets an internal timer thereof.

At step S115 the LSP control system 12 checks whether the 'set +' signal line 174 indicates that the 'set +' button 174 has been pressed. If the 'set +' button 174 has been pressed the LSP control system 12 continues at step S117 else the LSP control system 12 continues at step S119.

At step S117 the LSP control system 12 sets the flag_set_plus_button_pressed=1 and the flag resume_button_pressed=0. The LSP control system 12 then continues at step S123.

At step S119 the LSP control system 12 checks whether the resume signal line 173RS indicates that the resume button 173R has been depressed. If the resume button 173R has been depressed the LSP control system 12 continues at step S119 else the LSP control system continues at step S121.

At step S119 the LSP control system 12 sets the flag set_plus_button_pressed=0 and the flag resume_button_pressed=1. The LSP control system 12 then continues at step S123.

As described above, if neither the 'set +' button 174 nor the resume button 173R have been pressed, the LSP control system executes step S121. At step S121 the LSP control system 12 determines whether the flag active-armed=1. If the flag active-armed=1 the LSP control system 12 continues at step S125 else the LSP control system 12 continues at step S101.

At step S123 the LSP control system 12 sets the flag active-armed=1 and resets the timer.

At step S125 the LSP control system 12 checks whether the brake pressure signal line 22S and brake pedal signal line 163S indicated that the pressure of brake fluid in the braking system 22 is less than a predetermined brake release pressure due to user release of the brake pedal 163. In order to do this the LSP control system 12 may check that the pressure of brake fluid is less than a predetermined value and that the position of the brake pedal according to the signal line 163S is less than a predetermined amount of travel from a position corresponding to a fully released brake pedal 163.

If the LSP control system 12 determines that the pressure of brake fluid in the braking system 22 is less than a predetermined brake release pressure due to user release of the brake pedal 163, the LSP control system 12 continues at step S129 else the system 12 continues at step S127.

At step S127 the LSP control system 12 checks whether the timer value is less than a predetermined time value, if the timer value is less than the predetermined timer value the LSP control system 12 continues at step S115 else the control system 12 continues at step S101.

At step S129 the LSP control system 12 assumes the active mode. Subsequently, at step S131, the method ends.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system comprising:
    a first controller operable to assume an off state or one of one or more on states, in a first on state the first controller being configured to generate a first controller powertrain signal in order to cause a powertrain to develop drive torque and cause a vehicle to operate in accordance with a target speed value,
    the system being configured to cause the first controller to assume the first on state in dependence at least in part on receipt of a first input signal indicative that the controller is required to assume the first on state and a second signal indicative that a driver is operating a driver-operated brake control device in a brake-applied condition, being a condition in which a braking system of a vehicle is caused to apply a brake to one or more wheels.

2. A system according to claim 1, the system being configured to cause the first controller to assume the first on state in dependence at least in part on receipt of the first input signal after, and in overlapping coincidence with, the second signal.

3. A system according to claim 1 configured to cause the first controller to assume the first on state in dependence at least in part on the first and second signals in further dependence on a vehicle speed signal indicative of vehicle speed only when the vehicle speed signal indicates that a speed of the vehicle does not exceed a predetermined threshold speed.

4. A system according to claim 3 wherein the predetermined threshold speed is one in the range from zero to 2 kph.

5. A system according to claim 1 configured to cause the first controller to assume the first on state when a further condition is met that subsequent to receipt of the first signal, the second input signal provides an indication that the driver-operated brake control device has transitioned from the brake-applied condition to a brake-released condition in which the braking system does not apply a brake to one or more wheels.

6. A system according to claim 5 configured to cause the first controller to assume the first on state in dependence on the first and second signals when at least a further condition is met that a vehicle speed signal indicative of the vehicle speed indicates that a speed of the vehicle did not exceed a predetermined threshold immediately prior to the second signal providing the indication of the transition to the brake-released condition.

7. A system according to claim 5 configured to cause the first controller to assume the first on state when at least a further condition is met that the second signal provides the indication of the transition to the brake-released condition within a predetermined time-out period of the first signal providing the indication that the controller is required to assume the first on state.

8. A system according to claim 7 wherein the at least a further condition comprises the condition that the second signal provides the indication of the transition to the brake-released condition within the predetermined time-out period of a most recent moment at which the first signal provided the indication that the controller is required to assume the first on state.

9. A system according to claim 1 wherein the first controller is configured to assume, in dependence on a third input signal:
    a predetermined one of one or more on states, and
    the off state, being a state in which the first controller is substantially unresponsive to the first and second input signals.

10. A system according to claim 1 wherein the first controller is further configured to generate a first controller brake signal in order to cause application of said brake to one or more wheels thereby to cause a vehicle to operate in accordance with the target speed value.

11. A system according to claim 10 wherein the first controller is configured to generate the first controller brake signal when in the first on state.

12. A system according to claim 11 wherein the first controller is operable in a second on state in which the first controller is configured to generate the first controller brake signal and not the first controller powertrain signal in order to cause said vehicle to operate in accordance with the target speed value.

13. A system according to claim 12 wherein when the first controller transitions from the off state to an on state, the first controller is configured to assume the second on state.

14. A system according to claim 1 wherein in response to receipt of the first input signal indicative that the controller is required to assume the first on state the controller is configured to set the target speed value to a predetermined value.

15. A system according to claim 14 wherein in response to receipt of the first input signal indicative that the controller is required to assume the first on state the controller is configured to increase the prevailing target speed value from a prevailing value each time the first input signal is received provided the input signal indicative that the controller is required to assume the first on state has already been received at least once within a preceding predetermined time period.

16. A motor vehicle comprising a system according to claim 1.

17. A vehicle comprising a chassis, a body attached to said chassis, a plurality of wheels, a powertrain to drive said wheels, a braking system to brake said wheels, and a system according to claim 1.

18. A method of controlling a motor vehicle comprising:
    causing a first, speed, controller to assume one of a plurality of respective on states, in a first on state the method comprising generating by means of the first controller a first controller powertrain signal to cause a powertrain to develop drive torque and cause a vehicle to operate in accordance with a target speed value,
    the method comprising causing the first controller to assume the first on state in dependence at least in part on receipt of a first input signal indicative that the controller is required to assume the first on state and a second signal indicative that a driver is maintaining a driver-operated brake control device in a brake-applied condition, being a condition in which a braking system of said vehicle is caused to apply a brake to one or more wheels.

19. A non-transitory carrier medium carrying computer readable code for controlling a vehicle to carry out the method of claim 18.

20. A processor arranged to implement the method of claim 18.

* * * * *